(12) United States Patent
Kamimoto (10) Patent No.: US 9,584,697 B2
(45) Date of Patent: Feb. 28, 2017

(54) APPARATUS, SYSTEM, AND METHOD FOR EDITING AND DELIVERING DATA FILES (71) Applicant: Hiroshi Kamimoto, Tokyo (JP)

(72) Inventor: Hiroshi Kamimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/833,276

(22) Filed: Aug. 24, 2015

(65) Prior Publication Data
US 2016/0065784 A1 Mar. 3, 2016

(30) Foreign Application Priority Data

Aug. 26, 2014 (JP) ................................. 2014-171230

(51) Int. Cl.
H04N 1/387 (2006.01)
G06T 11/60 (2006.01)
H04N 1/21 (2006.01)
H04N 1/00 (2006.01)
G06F 17/21 (2006.01)
G06F 17/24 (2006.01)

(52) U.S. Cl.
CPC ........... *H04N 1/387* (2013.01); *G06F 17/217* (2013.01); *G06F 17/24* (2013.01); *H04N 1/00244* (2013.01); *H04N 1/00854* (2013.01); *H04N 1/2166* (2013.01); *H04N 2201/0065* (2013.01); *H04N 2201/0094* (2013.01)

(58) Field of Classification Search
None
See application file for complete search history.

(56) References Cited

U.S. PATENT DOCUMENTS 8,325,361 B2 * 12/2012 Shimura ............ H04N 1/00854
235/468
2007/0121146 A1 * 5/2007 Nesbit ................. H04L 12/5895
358/1.15

FOREIGN PATENT DOCUMENTS

JP 2010-074316 4/2010

* cited by examiner

*Primary Examiner* — Thomas D Lee
(74) *Attorney, Agent, or Firm* — IPUSA, PLLC (57) ABSTRACT An information processing apparatus includes a stored data acquiring unit configured to acquire stored data that is stored in a predetermined storage location of an output apparatus that is connected to the information processing apparatus via a network. The stored data is acquired from the predetermined storage location based on destination information of input data. The information processing apparatus further includes an editing unit configured to execute editing operations of combining the input data and the stored data acquired by the stored data acquiring unit to generate one single set of output data, and a delivery control unit configured to control delivery of the output data generated by the editing unit such that the output data is delivered, based on the destination information, to the predetermined storage location from which the stored data has been acquired.

20 Claims, 8 Drawing Sheets

APPARATUS, SYSTEM, AND METHOD FOR EDITING AND DELIVERING DATA FILES

BACKGROUND OF THE INVENTION

1. Field of the Invention

The present invention relates to an information processing apparatus, an information processing system, and an information processing method.

2. Description of the Related Art

For example, a delivery system is known for delivering an input image file that is input by a scan process or the like to a folder designated by a user (see e.g., Japanese Laid-Open Patent Publication No. 2010-074316).

SUMMARY OF THE INVENTION

According to one embodiment of the present invention, an information processing apparatus is provided that includes a stored data acquiring unit configured to acquire stored data that is stored in a predetermined storage location of an output apparatus that is connected to the information processing apparatus via a network. The stored data is acquired from the predetermined storage location based on destination information of input data. The information processing apparatus further includes an editing unit configured to execute editing operations of combining the input data and the stored data acquired by the stored data acquiring unit to generate one single set of output data, and a delivery control unit configured to control delivery of the output data generated by the editing unit such that the output data is delivered, based on the destination information, to the predetermined storage location from which the stored data has been acquired.

DESCRIPTION OF THE PREFERRED EMBODIMENTS

In using a delivery system for delivering input data such as a scanned image to a designated folder, a user may wish to organize and manage information from a specific person or customer in one folder, for example. However, conventional delivery systems do not include features for performing editing operations on a file by adding another file to an existing file that has already been delivered to the designated folder, and re-delivering the edited file as a single file, for example. To accomplish such a task, the file has to be manually edited by the user, for example, thereby imposing an operational burden on the user.

In view of the above, an aspect of the present invention is directed to improving operation efficiency in file delivery.

In the following, embodiments of the present invention are described with reference to the accompanying drawings.

<Delivery System Overall Configuration>

Figure 1:
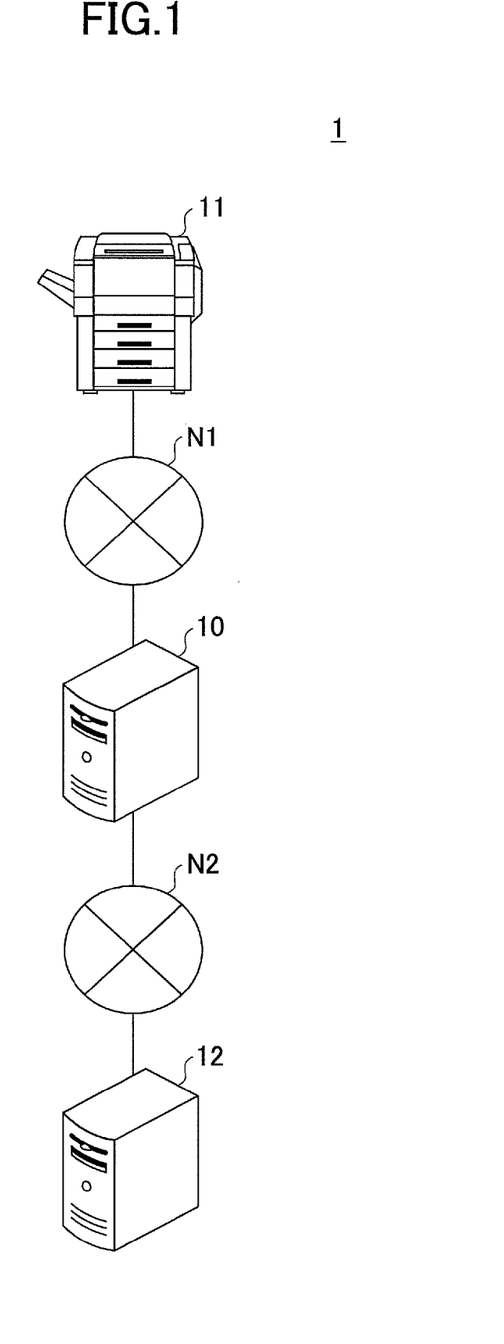
FIG. 1 illustrates an exemplary overall configuration of a delivery system according to an embodiment of the present invention.

FIG. 1 illustrates an exemplary overall configuration of a delivery system 1 according to an embodiment of the present invention. In FIG. 1, the delivery system 1, which is an example of an information processing system, includes a delivery server 10 as an example of a delivery apparatus, a MFP (Multi-Function Peripheral) 11 as an example of an image forming apparatus for inputting digital data, and a document management server 12 as an example of an output apparatus.

The delivery server 10 and the MFP 11 are connected to a network N1 such that data can be exchanged between the delivery server 10 and the MFP 11. The delivery server 10 and the document management server 12 are connected to a network N2 such that data can be exchanged between the delivery server 10 and the document management server 12. Note that the networks N1 and N2 may be any wired or wireless network such as a LAN (Local Area Network) or the Internet. Note, also, that features such as the number of the apparatuses included in the delivery system 1 is not limited to the example illustrated in FIG. 1.

The delivery server 10 is a computer that executes a predetermined process with respect to input data such as image data input by a scan process performed by the MFP 11, for example. Note that in some embodiments, the delivery server 10 may be implemented by a cloud computer that is configured by one or more information processing apparatuses, for example. In other embodiments, the delivery server 10 may be implemented by a single information processing apparatus or a plurality of information processing apparatuses in a distributed manner, for example.

The MFP 11 is an image forming apparatus having multiple functions including a scan function, a copy function, a printer function, and a facsimile function, for example. Note, however, that the present invention is not limited to using such a multifunction peripheral apparatus. For example, any apparatus that is capable of inputting digital data such as image data may be used including a scanner, a facsimile machine, a copying machine, and the like.

The document management server 12 manages files that are shared over the network N2, for example. The document management server 12 may be accessed by a delivery process that is executed by the delivery server 10, for example.

In the delivery system 1 illustrated in FIG. 1, when the delivery server 10 acquires input data from the MFP 11, the delivery server 10 acquires an existing file stored in a predetermined storage location of the document management server 12. Also, the delivery server 10 performs editing operations such as adding (inserting) the input data at a predetermined position of the existing file, and controls delivery operations such that the edited file may be delivered as a single file to the predetermined storage location of the document management server 12 from which the existing file was acquired, for example.

In this way, for example, when a slip file in the PDF file format is stored in an existing folder of a customer environment, a newly acquired slip may be converted into the same PDF file format, and the converted file may be added to the existing file that is stored in the existing folder. By performing such operations, slips acquired over a one-week period or some other time unit may be organized and managed as a single slip file in the existing folder, for example.

Note that in some embodiments, the delivery server 10 and the MFP 11 of FIG. 1 may be integrated. For example, the functions of the delivery server 10 may be implemented by the MFP 11.

<Hardware Configuration>

Figure 2:
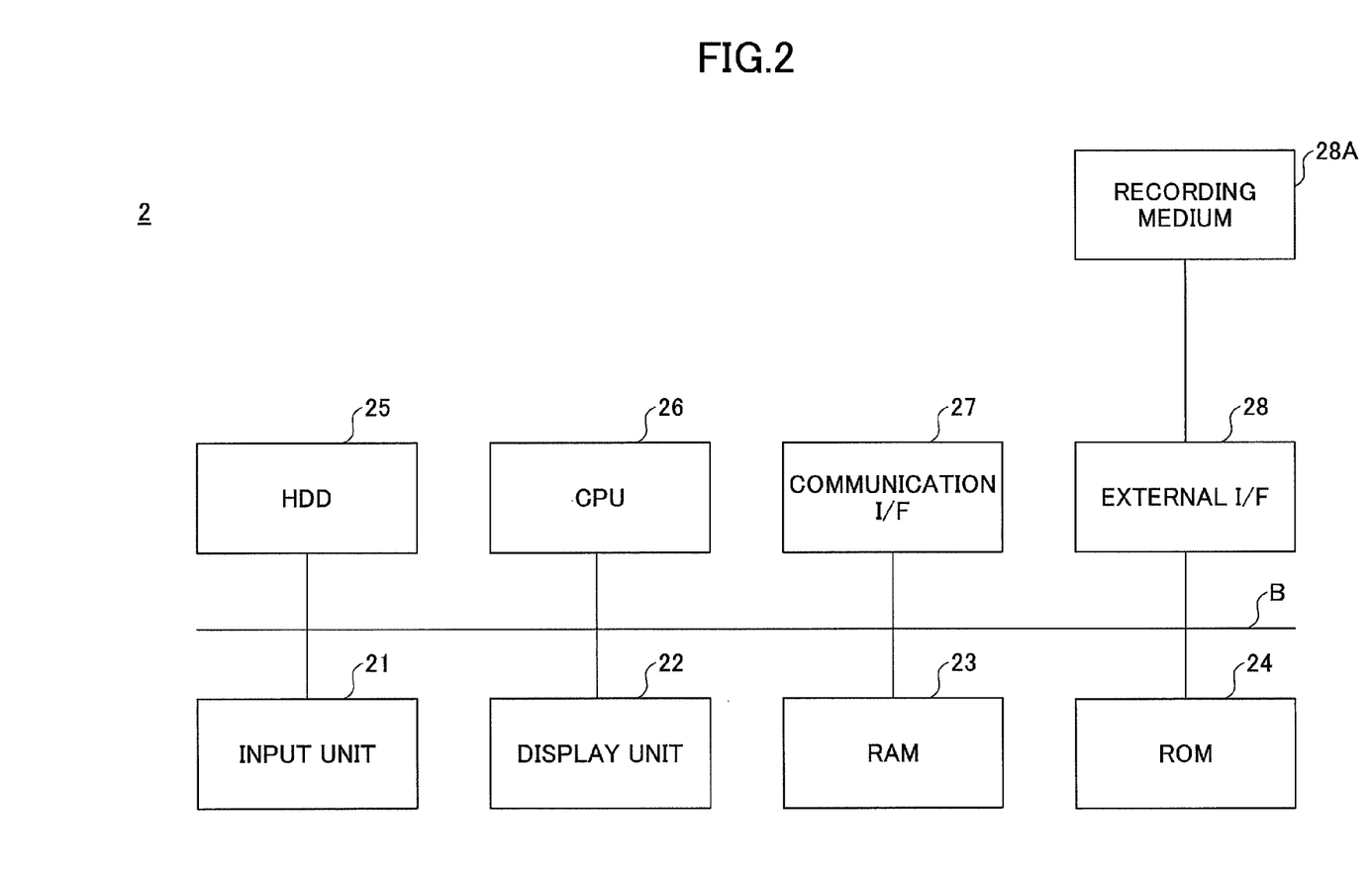
FIG. 2 illustrates an exemplary hardware configuration of a computer system.

The delivery server 10 and the document management server 12 may be implemented by a computer system hardware configuration as illustrated in FIG. 2, for example. FIG. 2 illustrates an exemplary hardware configuration of a computer system 2.

In FIG. 2, the computer system 2 includes an input unit 21, a display unit 22, a RAM (Random Access Memory) 23, a ROM (Read Only Memory) 24, a HDD (Hard Disk Drive) 25, a CPU (Central Processing Unit) 26, a communication I/F (interface) 27, and an external I/F 28 that are interconnected via a bus B.

The input unit 21 may include a keyboard, a mouse, and/or a touch panel, for example, and is used by a user to input various operation signals. The display unit 22 may include a display, for example, and is configured to display processing results of the computer system 2.

The RAM 23 is a volatile semiconductor memory (storage device) that temporarily stores programs and/or data. The ROM 24 is a nonvolatile semiconductor memory (storage device) that can store programs and/or data even when the power is turned off. The ROM 24 stores programs and data such as BIOS (Basic Input/Output System) to be executed when the computer system 2 is started, OS (Operation System) settings, network settings, and the like.

The HDD 25 is a nonvolatile storage device that stores programs and data. The programs and data stored in the HDD 25 may include OS corresponding to basic software controlling overall operations of the computer system 2, and application software providing various functions under the control of the OS, for example.

The programs and data stored in the HDD 25 are managed by a predetermined file system and/or a DB (database). Note that in some embodiments, the computer system 2 may include a SSD (Solid State Drive) instead of the HDD 25, for example.

The CPU 26 includes an arithmetic and logic unit that reads a program and/or data from a storage device such as the ROM 24 and/or the HDD 25, loads the program and/or data in the RAM 23, and executes processes according to the program and/or data to control overall operations and functions of the computer system 2.

The communication I/F 27 is an interface for connecting the computer system 2 to the networks N1 and N2. In this way, the computer system 2 may establish data communication with other computers via the communication I/F 107.

The external I/F 28 is an interface between the computer system 2 and an external device. The external device may be a recording medium 28A, for example. The computer system 2 may read information from and/or write information on the recording medium 28A via the external I/F 28.

Specific examples of the recording medium 28A include a flexible disk, a CD (Compact Disk), a DVD (Digital Versatile Disk), a SD memory card, a USB (Universal Serial Bus) memory, and the like.

The delivery server 10 and the document management server 12 may implement various processes as described below using the hardware configuration of the computer system 2 as illustrated in FIG. 2.

In the following, functional configurations of the MFP 11 and the delivery server 10 are described with reference to the drawings.

<MFP Functional Configuration>

Figure 3:
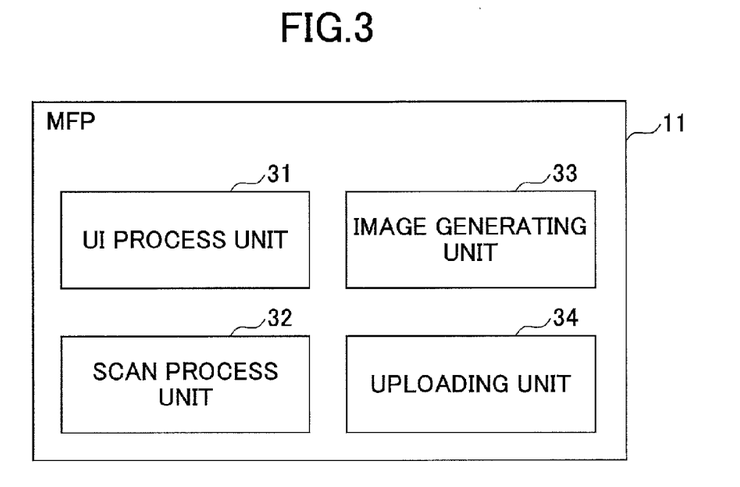
FIG. 3 illustrates an exemplary functional configuration of a multifunction peripheral according to an embodiment of the present invention.

FIG. 3 illustrates an exemplary functional configuration of the MFP 11 according to the present embodiment. In FIG. 3, the MFP 11 includes a UI process unit 31, a scan process unit 32, an image generating unit 33, and an uploading unit 34.

The UI process unit 31 determines whether a file in a predetermined format such as a PDF file is designated based on destination information input by a user via a prescribed user interface screen (UI screen) or the like. When the UI process unit 31 determines that a PDF file is designated, for example, the UI process unit 31 may display a PDF password input screen for prompting the user to input a PDF password unlocking a security lock on the PDF file to enable editing of the PDF file.

Note that a file format that may be used in the present embodiment is not limited to a PDF file, and any data in a multi-page file format such as a document file or a TIFF (Tagged Image File Format) file may be used, for example. Also, other file formats such as those for spreadsheet files may be used. In such case, process operations performed on a page of a PDF file in the descriptions below may be performed on a sheet of a spreadsheet file, for example.

The scan process unit 32 executes a scan process of scanning a document such as a slip, an estimate, a diary, meeting minutes, or a contract, for example. Note that a document to be scanned in the present embodiment is not limited to the documents described above. That is, any document that is periodically issued or is arranged into a predetermined format (e.g., template) may be subject to the scan process. Also, the scan process unit 32 may be configured to acquire data scanned by an external device via a network, for example.

After executing a scan process, the scan process unit 32 may output a scanned image generated by the image generating unit 33 along with destination information and a PDF password acquired by the UI process unit 31, for example, to the uploading unit 34.

The image generating unit 33 generates a scanned image of a document subject to a scan process executed by the scan process unit 32. The uploading unit 34 may use an HTTP request, for example, to transmit and upload the scanned image acquired from the scan process unit 32 and the destination information and PDF password designated by the user to the delivery server 10.

<Delivery Server Functional Configuration>

Figure 4:
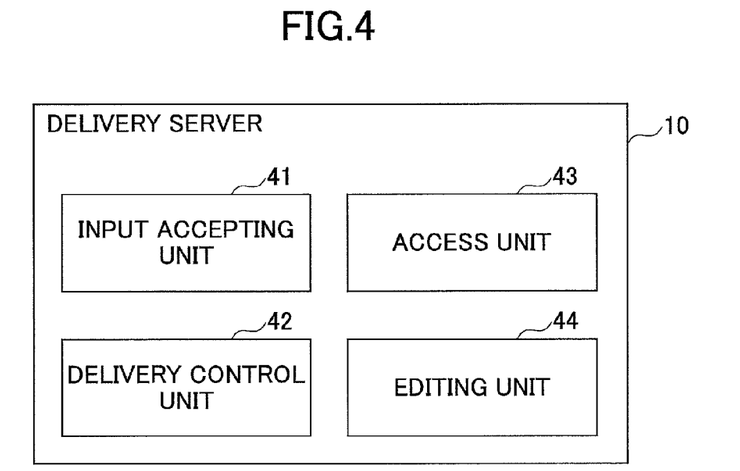
FIG. 4 illustrates an exemplary functional configuration of a delivery server according to an embodiment of the present invention.

FIG. 4 illustrates an exemplary functional configuration of the delivery server 10 according to the present embodiment. In FIG. 4, the delivery server 10 includes an input accepting unit 41, a delivery control unit 42, an access unit 43 as an example of a stored data acquiring unit, and an editing unit 44.

The input accepting unit 41 accepts input data such as a scanned image obtained by the MFP 11, destination information, and/or a PDF password, and outputs the accepted scanned image, destination information, and/or PDF password to the delivery control unit 42. Note that in a case where a password is not entered, the input accepting unit 41 may output only the scanned image and the destination information to the delivery control unit 42.

The delivery control unit 42 controls delivery of the scanned image accepted by the input accepting unit 41. The delivery control unit 42 refers to the destination information designated by the user, and for example, when a predetermined file such as a PDF file is specified by the destination information, the delivery control unit 42 acquires the designated file (existing PDF file) that is stored in a predetermined storage location specified by the destination information via the access unit 43.

Note that the predetermined storage location specified by the destination information that is designated by the user may represent a predetermined folder in a customer environment such as the document management server 12, for example. Also, the existing PDF file is an example of stored data, and represents a file that has been converted into a predetermined file format such as a PDF file and stored in a folder designated by the user, for example.

Further, when the delivery control unit 42 acquires combined data generated by combining the scanned image and the stored data as an example of output data output by the editing unit 44, the delivery control unit 42 delivers the combined data via the access unit 43 to the storage location such as the document management server 12 from which the stored data was acquired, for example.

The access unit 43 may acquire stored data from a predetermined storage location of the document management server 12 or deliver output data to the predetermined storage location of the document management server 12 based on the destination information obtained from the delivery control unit 42, for example. Also, based on the destination information, the access unit 43 determines the communication protocol to be used such as the SMB (Server Message Block) protocol, the HTTP (HyperText Transfer Protocol), or the FTP (File Transfer Protocol), for example.

The editing unit 44 combines the scanned image (input data) acquired from the delivery control unit 42 with stored data and edits the data as output data. For example, the editing unit 44 may convert the data format of the scanned image according to the data format of the stored data (e.g., PDF file format), and combine the converted scanned image with the stored data. However, the editing operations of the editing unit 44 are not limited to the above example, and in some cases, the format of the stored data may be converted according to the format of the input data.

In a case where the scanned image and the stored data are in a standard format or template (e.g., slip), the editing unit 44 may rearrange the scanned image and the stored data based on a character string (e.g., slip serial number) obtained from a predetermined region of the standard format or template, for example. Also, the editing unit 44 may be capable of editing the stored data using a password that is obtained at the time the scanned image is input, for example.

<File Delivery Sequence>

Figure 5:
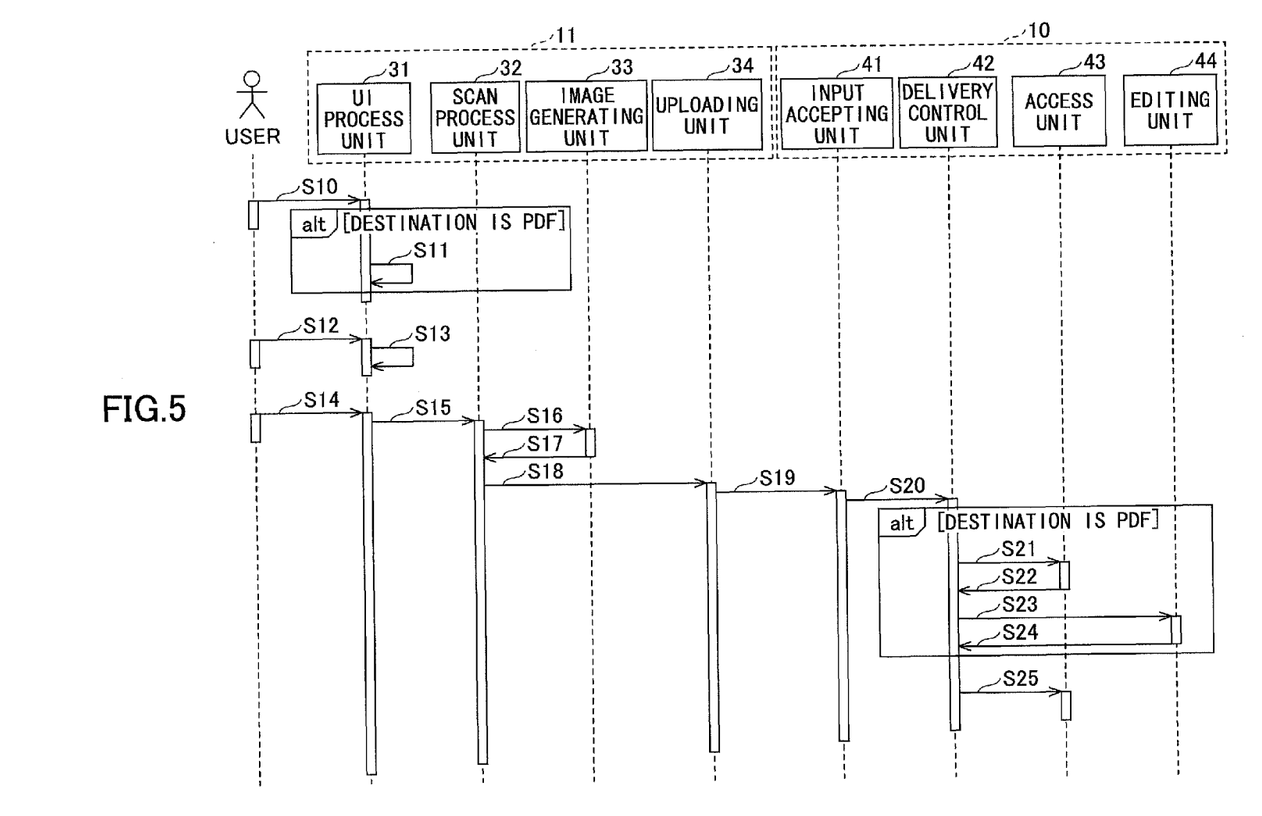
FIG. 5 is a sequence chart illustrating an exemplary file delivery process according to an embodiment of the present invention.

FIG. 5 is a sequence chart illustrating an exemplary file delivery process according to the present embodiment. The file delivery process illustrated in FIG. 5 may be executed by the MFP 11 and the delivery server 10, for example.

As illustrated in FIG. 5, when a user operates the MFP 11 to designate a destination (step S10), the UI process unit 31 of the MFP 11 determines whether a PDF file is designated, for example (step S11). In step S11, the UI process unit 31 may determine whether a PDF file is designated based on an extension included in destination information that is input by the user designation operation of step S10, for example.

When an input screen is displayed by the process operations of step S11 and the user inputs a PDF password via the input screen (step S12), the UI process unit 31 stores the input PDF password (step S13). When a scan start instruction is input by the user (step S14), the UI process unit 31 outputs the destination information designated by the user and the PDF password to the scan process unit 32 (step S15).

When executing a scan process, the scan process unit 32 sends a scanned image acquisition request to the image generating unit 33 (step S16), and acquires a scanned image from the image generating unit 33 (step S17). The scan process unit 32 outputs the destination information designated by the user, the PDF password, and the scanned image to the uploading unit 34 (step S18).

The uploading unit 34 transmits the destination information designated by the user, the PDF password, and the scanned image to the input accepting unit 41 of the delivery server 10 using an HTTP request, for example (step S19).

The input accepting unit 41 outputs the destination information designated by the user, the PDF password, and the scanned image to the delivery control unit 42, and issues a delivery request to the delivery control unit 42 (step S20). The delivery control unit 42 refers to the destination information designated by the user, and for example, if a predetermined file such as a PDF file is designated, the delivery control unit 42 issues an acquisition request to the access unit 43 to acquire a file (existing PDF file) stored in a predetermined storage location specified by the destination information (step S21).

After the process of step S21, the access unit 43 determines a communication protocol to be used based on the destination information. For example, if the head of the destination information is "¥¥" ("//"), the access unit 43 determines that the SMB protocol is to be used. Also, for example, if the head of the destination information is "HTTP", the access unit 43 determines that the HTTP protocol is to be used. Also, for example, if the head of the destination information is "FTP", the access unit 43 determines that the FTP protocol is to be used. Based on the destination information, the access unit 43 acquires the existing PDF file from the predetermined storage location of the document management server 12, for example.

When the delivery control unit 42 acquires the existing PDF file from the access unit 43 (step S22), the delivery control unit 42 outputs the existing PDF file, the scanned image, and the PDF password to the editing unit 44 and requests the editing unit 44 to generate combined data (combined PDF file) as an example of output data (step S23).

When the delivery control unit 42 acquires the combined PDF file from the editing unit 44 (step S24), the delivery control unit 42 outputs the combined PDF file and the destination information of the user to the access unit 43, and requests the access unit 43 to deliver the combined PDF file to the document management server 12 (step S25). The access unit 43 may determine the communication protocol to be used based on the destination information of the combined PDF file in a manner similar to the process operations performed after step S21, and deliver the combined PDF file using the determined communication protocol.

<MFP User Interface Screen>

Figure 6A:
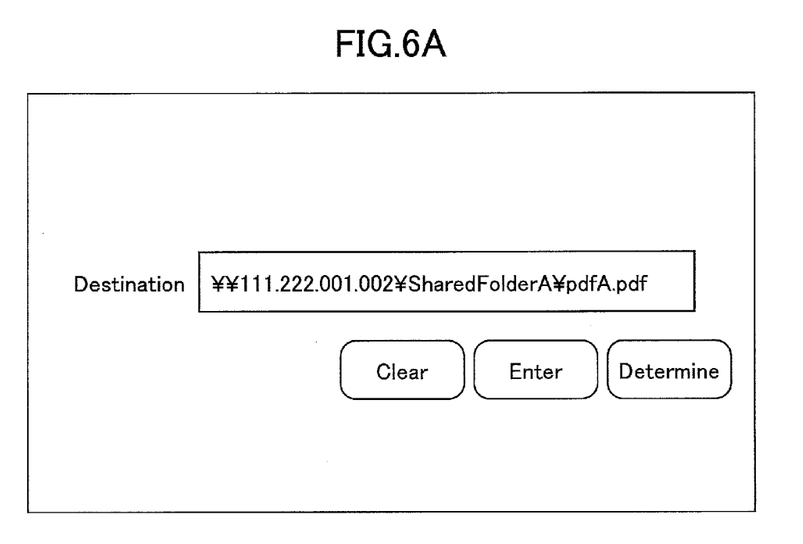
FIGS. 6A and 6B illustrate exemplary user interface screens of the multifunction peripheral.
Figure 6B:
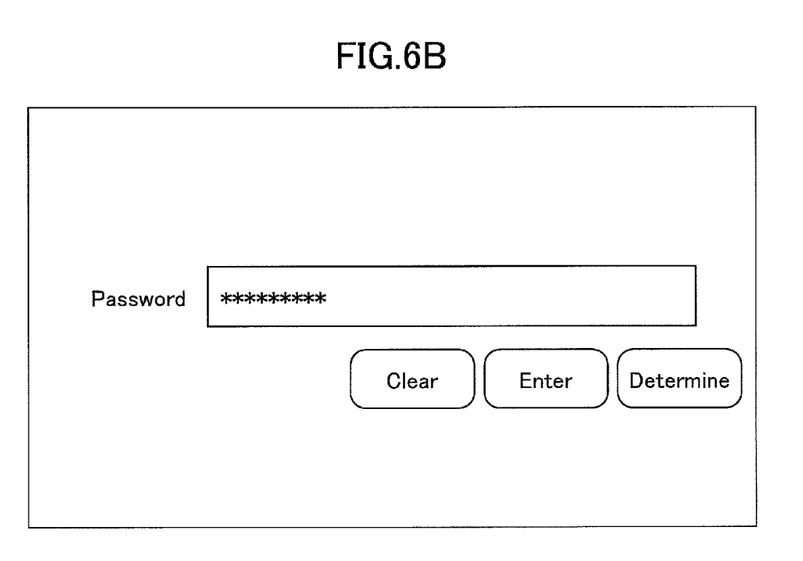

FIGS. 6A and 6B illustrate examples of user interface screens of the MFP 11. FIG. 6A illustrates an example of an input screen for inputting destination information of a scanned image. FIG. 6B illustrates an example of an input screen for inputting a PDF password.

In the input screen illustrated in FIG. 6A, when entering the destination information of the scanned image, the user may designate a path of a target folder to which output data is to be delivered, for example. Also, in a case where the user wishes to have data overwritten on a file (e.g., PDF file) that is stored in a folder, the user may designate the path of the corresponding file (e.g., PDF file).

Note that in some embodiments, the UI process unit 31 of the MFP 11 may acquire a list of folders that can be accessed from the document management server 12 via the delivery server 10, display the folder list on a user interface screen, and prompt the user to select a path of a target folder to which the user wishes to deliver data, for example. Also, the UI process unit 31 may prompt the user to select a pre-defined workflow (process flow) such as a slip management workflow or an estimate generation workflow to designate predetermined destination information (the path of the target folder), for example.

In the case where a PDF file or the like is designated at the input screen as illustrated in FIG. 6A, the UI process unit 31 of the MFP 11 may display an input screen for inputting a PDF password as illustrated in FIG. 6B, for example, and prompt the user to input a password. Note that in a case where a password is unnecessary, the input field of the input screen may be left empty, for example.

In this way, even in a case where an existing PDF file stored in the target folder cannot be opened because a password is set up for the existing PDF file, the password may be acquired from the user and the acquired password may be used to open the existing PDF file. Further, when an incorrect password is input, or when no password is input such that the existing PDF file cannot be opened, a message may be displayed on the screen prompting the user to reenter a password, for example.

Note that user interface screens used in the present embodiment are not limited to the examples illustrated in FIGS. 6A and 6B. For example, one user interface screen for entering destination information and a password may be used.

<Combined File Examples>

In the following, examples of combined files generated by the above-described editing unit 44 combining a scanned image (input data) and an existing PDF file (stored data) are described. FIGS. 7-10 illustrate combination examples of files to be delivered in the present embodiment. Note that in FIGS. 7-10, numerals preceded by the symbol "P" represent page numbers, and numerals preceded by the symbol "SLIP NO." represent slip numbers.

<First Combination Example>

Figure 7:
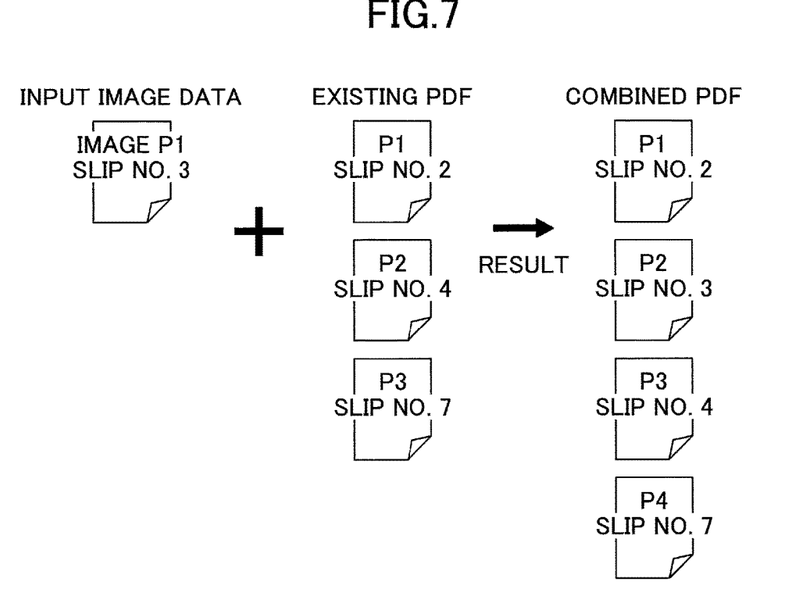
FIG. 7 illustrates a first combination example of files to be delivered according to an embodiment of the present invention.

In a first combination example as illustrated in FIG. 7, the scanned image (input image data) corresponds to a slip with a slip number NO. 3, and the existing PDF file (existing PDF) includes slips with slip numbers NO. 2, NO. 4, and NO. 7. Note that the slip number may be indicated at a predetermined position (predetermined region) of a page in a standard format (template) of a slip, for example.

Thus, for example, the editing unit 44 may perform partial OCR (Optical Character Recognition) on the predetermined region of each of the scanned image and the existing PDF file to read the slip numbers. Also, the editing unit 44 may sort pages based on the read slip numbers, insert the scanned image into the existing PDF file, combine the files into a single file in the PDF file format, for example, and generate a combined PDF file (combined PDF) as an example of output data.

Note that in other examples, page numbers may be extracted and used to insert a page between pages of an existing file, and output data may be updated accordingly. In the sorting process described above, the pages may be sorted in ascending order or descending order. Also settings relating to a region from which a character string is to be extracted, the type of character string to be extracted, the manner in which sorting is to be performed, and the format to be used for combining the files may be set up by the user, for example. Alternatively, the settings may be set up beforehand in a pre-defined slip management workflow, for example. In the case of using a workflow, the user may select the workflow at the time the scanned image is input, and in this way, the above process of combining files may be implemented, for example.

<Second Combination Example>

Figure 8:
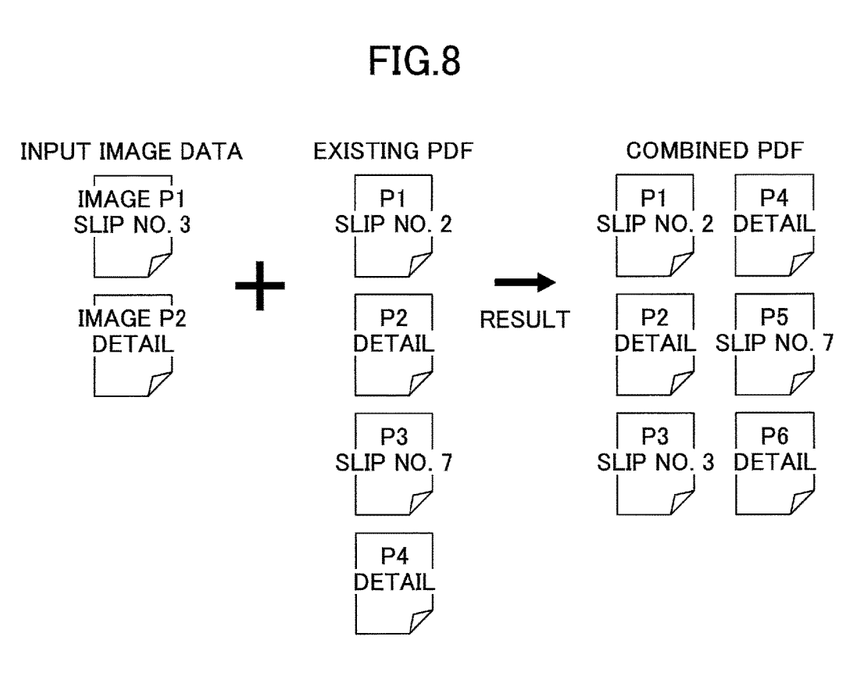
FIG. 8 illustrates a second combination example of files to be delivered according to an embodiment of the present invention.

In a second combination example as illustrated in FIG. 8, the scanned image (input image data) includes a slip with a slip number NO. 3 and a page with details thereof. The existing PDF file (existing PDF) includes a slip with a slip number NO. 2 and a page with details thereof, and a slip with a slip number NO. 7 and a page with details thereof. In such a case, the editing unit 44 may regard the images of the slip and the page with details thereof as one set, insert the set of scanned images between the sets of existing PDF images, and combine the files into a single file in the PDF file format, for example, to generate a combined PDF file as output data.

In the case where the standard format of a slip or the like extends beyond one page to include a plurality of pages (2 pages in the example of FIG. 8), the plurality of pages may be regarded as one set, and page editing may be performed in page set units so that a page of given set of pages may be prevented from being inserted between pages of another set of pages, for example.

<Third Combination Example>

Figure 9:
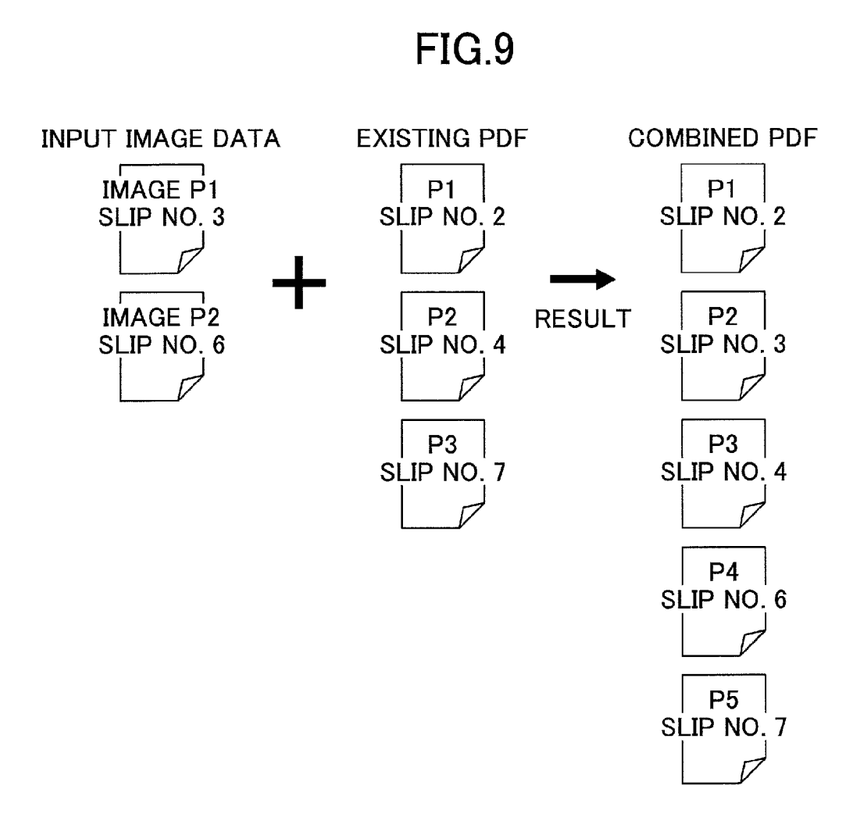
FIG. 9 illustrates a third combination example of files to be delivered according to an embodiment of the present invention.

In a third combination example as illustrated in FIG. 9, the scanned image (input image data) includes slips with slip numbers NO. 3 and NO. 6, and the existing PDF file (existing PDF) includes slips with slip numbers NO. 2, NO. 4, and NO. 7. In such a case, the editing unit 44 may read the above slip numbers through partial OCR, insert each of the scanned images between the existing PDF images according to the read slip numbers, combine the files into a single file in the PDF file format, for example, and generate a combined PDF file as output data.

In a case where the scanned image corresponds to neither a set of a plurality of pages of a slip nor slips with successive slip numbers, editing operations are separately performed based on the slip number of each page of the scanned image.

<Fourth Combination Example>

Figure 10:
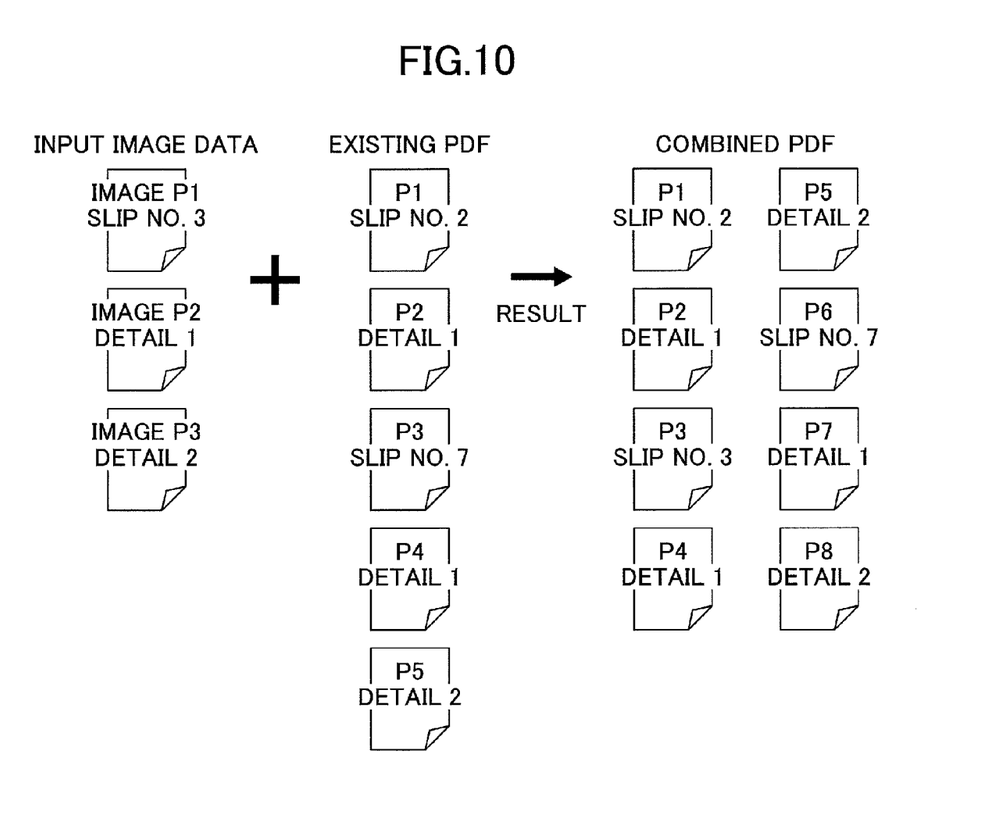
FIG. 10 illustrates a fourth combination example of files to be delivered according to an embodiment of the present invention.

In a fourth combination example as illustrated in FIG. 10, the scanned image (input image data) includes a slip with a slip number NO. 3 and a plurality of pages with details of the slip (detail 1 and detail 2). The existing PDF file includes a slip with a slip number NO. 2 and a page with details of the slip (detail 1), and a slip with a slip number NO. 7 and a plurality of pages with details of the slip (detail 1 and detail 2). In such a case, the editing unit 44 may regard the scanned images of the slip and the plurality of pages with details thereof (detail 1 and detail 2) as one set, insert the set of scanned images into the existing PDF file, and combine the files into a single file in the PDF file format, for example, to generate a combined PDF file as output data.

In a case where the number of pages constituting a given set varies, partial OCR or the like may be performed to read/recognize a slip number at a predetermined position of each page, for example, and when no slip number can be read/recognized from a page, the corresponding page may be determined to belong to a set of pages including an earlier page from which a slip number has been read/recognized, for example. In this way, a plurality of sets of pages with varying numbers of pages may be identified and editing may be performed in units of these sets of pages, for example.

As described above, the editing unit 44 reads a predetermined character string from a predetermined region of a standard format for a scanned image and an existing PDF file and generates output data combining the scanned image and the existing PDF file.

In this way, for example, editing operations such as adding another file to a file that is already stored in a designated folder and delivery operations of redelivering the files as one single file to the designated folder may be performed without requiring manual operations by the user, for example.

Note that in the first to fourth combination examples described above, processing is performed with respect to one or a plurality of pages. However, the present invention is not limited to the above examples, and in other examples, processing may be performed with respect to one or more sheets when files are created using spreadsheet software, for example. Moreover, the present invention is not limited to processing PDF files as in the examples described above, and in other examples, files in other multi-page formats such as TIFF files may be subject to processing. Note that the type of file to be used may be specified by the user or pre-defined by the workflow to be implemented, for example.

Also, in the first to fourth combination examples described above, examples of combining (editing) files through page insertion are described. However, the present invention is not limited thereto, and in other examples, file editing may include page replacement or the like.

Further, for example, when a relatively large number of existing PDF files are stored in a specified folder of the document management server 12, the user may have to search through the existing PDF files to select the relevant PDF file to which input data such as a scanned image is to be delivered. In such a case, the above-described partial OCR may be used to read certain data such as a document title and a time/date from the scanned image (input data), and the read data may be used to create a file name for the input data according to a predetermined rule, for example.

For example, the file name may be created by combining one or more items of data read from the scanned image in the following manner: "document-title_scan-year_scan-month-.pdf". Note, however, that the present invention is not limited to the above example. By creating a file name according to a predetermined rule in the manner described above, for example, the user may only need to select a target folder as a delivery destination, and in turn, the file name of a corresponding delivery destination file may be selected based on the predetermined rule, for example.

According to an aspect of the present embodiment, by performing editing operations such as adding and changing existing files according to the customer environment, work efficiency may be improved in file delivery operations, for example.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2014-171230 filed on Aug. 26, 2014, the entire contents of which are hereby incorporated by reference.

What is claimed is:

1. An information processing apparatus comprising:
a memory; and
a processor configured to implement processes of
acquiring stored data that is stored in a predetermined storage location of an output apparatus connected to the information processing apparatus via a network, the stored data being acquired from the predetermined storage location based on destination information of input data;
executing editing operations of combining the input data and the acquired stored data to generate one single set of output data; and
controlling delivery of the generated output data such that the generated output data is delivered, based on the destination information, to the predetermined storage location from which the stored data has been acquired.

2. The information processing apparatus as claimed in claim 1, wherein the processor converts a format of the input data according to a format of the stored data, and combines the converted input data and the converted stored data.

3. The information processing apparatus as claimed in claim 2, wherein the processor generates the output data by inserting a predetermined page of the input data into a predetermined page of the stored data based on a character string obtained from a predetermined region of a standard format for the input data and the stored data.

4. The information processing apparatus as claimed in claim 1, wherein the processor generates the output data by inserting a predetermined page of the input data into a predetermined page of the stored data based on a character string obtained from a predetermined region of a standard format for the input data and the stored data.

5. The information processing apparatus as claimed in claim 1, wherein at a time the input data is input, a password that is set up for the stored data is input, and the processor uses the password to enable editing of the stored data on which the password is set up.

6. The information processing apparatus as claimed in claim 1, wherein the processor uses at least one of server message block (SMB) protocol, hypertext transfer protocol (HTTP), and file transfer protocol (FTP) as a communication protocol.

7. The information processing apparatus as claimed in claim 1, wherein an image forming apparatus or a delivery apparatus that is connected to the image forming apparatus acts as the information processing apparatus.

8. The information processing apparatus as claimed in claim 7, wherein the input data includes image data input by a scan process executed by the image forming apparatus.

9. An information processing system comprising:
a delivery apparatus for delivering input data; and
an output apparatus that is connected to the delivery apparatus via a network, the output apparatus including:
  a memory; and
  a hardware processor that implements processes of
    storing output data that is delivered from the delivery apparatus in the output apparatus;
    acquiring stored data at the delivery apparatus, the stored data being stored in a predetermined storage location of the output apparatus and being acquired from the predetermined storage location based on destination information of the input data;
    executing editing operations at the delivery apparatus, the editing operations including combining the input data and the acquired stored data to generate one single set of output data; and
    controlling delivery of the output data generated at the delivery apparatus such that the output data is delivered, based on the destination information, to the predetermined storage location from which the stored data has been acquired.

10. The information processing system as claimed in claim 9, wherein the processor converts a format of the input data according to a format of the stored data, and combines the converted input data and the converted stored data.

11. The information processing system as claimed in claim 9, wherein the processor generates the output data by inserting a predetermined page of the input data into a predetermined page of the stored data based on a character string obtained from a predetermined region of a standard format for the input data and the stored data.

12. The information processing system as claimed in claim 9, wherein at a time the input data is input, a password that is set up for the stored data is input, and the processor uses the password to enable editing of the stored data on which the password is set up.

13. The information processing system as claimed in claim 9, wherein the processor uses at least one of server message block (SMB) protocol, hypertext transfer protocol (HTTP), and file transfer protocol (FTP) as a communication protocol.

14. The information processing system as claimed in claim 9, wherein the input data includes image data input by a scan process executed by an image forming apparatus.

15. An information processing method that is implemented by an information processing system including a delivery apparatus for delivering input data and an output apparatus that is connected to the delivery apparatus via a network, the information processing method comprising:
a data storing step of storing output data that is delivered from the delivery apparatus in the output apparatus;
a stored data acquiring step of acquiring stored data from the output apparatus at the delivery apparatus, the stored data being stored in a predetermined storage location of the output apparatus and being acquired from the predetermined storage location based on destination information of the input data;
an editing step of executing editing operations at the delivery apparatus, the editing operations including combining the input data and the stored data acquired in the stored data acquiring step to generate one single set of output data; and
a delivery control step of controlling delivery of the output data generated in the editing step at the delivery apparatus such that the output data is delivered, based on the destination information, to the predetermined storage location from which the stored data has been acquired.

16. The information processing method as claimed in claim 15, wherein the editing step includes converting a format of the input data according to a format of the stored data, and combining the converted input data and the stored data.

17. The information processing method as claimed in claim 15, wherein the editing step includes generating the output data by inserting a predetermined page of the input data into a predetermined page of the stored data based on a character string obtained from a predetermined region of a standard format for the input data and the stored data.

18. The information processing method as claimed in claim 15, wherein at a time the input data is input, a password that is set up for the stored data is input, and the editing step includes using the password to enable editing of the stored data on which the password is set up.

19. The information processing method as claimed in claim 15, wherein the stored data acquiring step includes using at least one of server message block (SMB) protocol, hypertext transfer protocol (HTTP), and file transfer protocol (FTP) as a communication protocol.

20. The information processing method as claimed in claim 15, wherein the input data includes image data input by a scan process executed by an image forming apparatus.

* * * * *